US008232926B2

(12) United States Patent
Iwai et al.

(10) Patent No.: US 8,232,926 B2
(45) Date of Patent: Jul. 31, 2012

(54) MOBILE WIRELESS DEVICE (75) Inventors: Nobuhiro Iwai, Kanagawa (JP);
Yasuhiro Kitajima, Kanagawa (JP);
Kenshi Horihata, Kanagawa (JP);
Kenichi Sato, Miyagi (JP); Hironori Kikuchi, Miyagi (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 12/863,039

(22) PCT Filed: Dec. 25, 2008

(86) PCT No.: PCT/JP2008/003977
§ 371 (c)(1),
(2), (4) Date: Jul. 15, 2010

(87) PCT Pub. No.: WO2009/090720
PCT Pub. Date: Jul. 23, 2009

(65) Prior Publication Data
US 2011/0057847 A1 Mar. 10, 2011

(30) Foreign Application Priority Data
Jan. 15, 2008 (JP) ................................ 2008-006001

(51) Int. Cl.
*H01Q 1/24* (2006.01)
*H04M 1/00* (2006.01)
(52) U.S. Cl. ..................................... 343/702; 455/575.3
(58) Field of Classification Search ................... 343/702, 343/872, 876; 455/575.1, 575.3, 575.7
See application file for complete search history.

(56) References Cited

U.S. PATENT DOCUMENTS
7,436,364 B2 * 10/2008 Nishikido et al. ............ 343/702
(Continued)

FOREIGN PATENT DOCUMENTS
EP 1746682 A1 1/2007
(Continued)

OTHER PUBLICATIONS
Extended European Search Report, dated May 24, 2011, in EP 08871089, 5 pages.
(Continued)

*Primary Examiner* — Jacob Y Choi
*Assistant Examiner* — Hasan Islam
(74) *Attorney, Agent, or Firm* — Seed IP Law Group PLLC (57) ABSTRACT There is provided a mobile wireless device capable of preventing antenna characteristics from degrading by feeding electric power at a position hardly affected by a human body such as a hand or other body part. In the mobile wireless device, a first circuit board (101) is provided on a first chassis (110) and has a ground layer; a second circuit board (105) is provided on a second chassis (120) and has a ground layer. A ground terminal of a wireless portion (104) is connected to the ground layer of the first circuit board (101) at the same voltage level and is also electrically connected through the wireless portion (104) to a matching circuit (103). The ground layer of the second circuit board (105) is electrically connected to a hinge conducting portion (106) by electrostatic capacitance coupling. The hinge conducting portion (106) is connected through a third conduction portion (107) to a board connection portion (102) and feeds power to the wireless portion through the matching circuit (103). This enables the ground layer of the first circuit board (101), the third conduction portion (107), the hinge conducting portion (106), and the ground layer of the second circuit board (105) to function as an antenna resonating at a predetermined resonant frequency.

6 Claims, 10 Drawing Sheets

U.S. PATENT DOCUMENTS

| | | | |
|---|---|---|---|
| 2005/0239519 A1 | 10/2005 | Saitou et al. | 455/575.1 |
| 2007/0164913 A1 | 7/2007 | Sakamoto et al. | 343/702 |
| 2008/0020812 A1 | 1/2008 | Kobayashi et al. | 455/575.3 |
| 2009/0233657 A1* | 9/2009 | Ogawa | 455/575.3 |

FOREIGN PATENT DOCUMENTS

| | | |
|---|---|---|
| JP | 3280625 A | 12/1991 |
| JP | 2004-229048 | 8/2004 |
| JP | 2006-067133 | 3/2006 |
| JP | 2007-110253 | 4/2007 |
| JP | 200788692 A | 4/2007 |
| WO | 2006/022331 | 3/2006 |
| WO | 2006/046712 | 5/2006 |
| WO | 2006/057350 | 6/2006 |

OTHER PUBLICATIONS

International Search Report relating to International Application No. PCT/JP2008/003977, mailed Feb. 3, 2009, 2 pages.

* cited by examiner

CURRENT DISTRIBUTION

FIG.1

CURRENT DISTRIBUTION

MOBILE WIRELESS DEVICE

TECHNICAL FIELD

The present invention relates to a mobile radio apparatus that utilizes a dipole antenna to receive radio waves of, for example, one-segment broadcasting of terrestrial digital broadcasting of transmitting video images.

BACKGROUND ART

Recently, there is an increasing demand for mobile radio apparatuses that can be used to view one-segment broadcasting of terrestrial digital broadcasting. Radio waves of one-segment broadcasting have low frequencies, and therefore the antenna length should be long.

Figure 1:
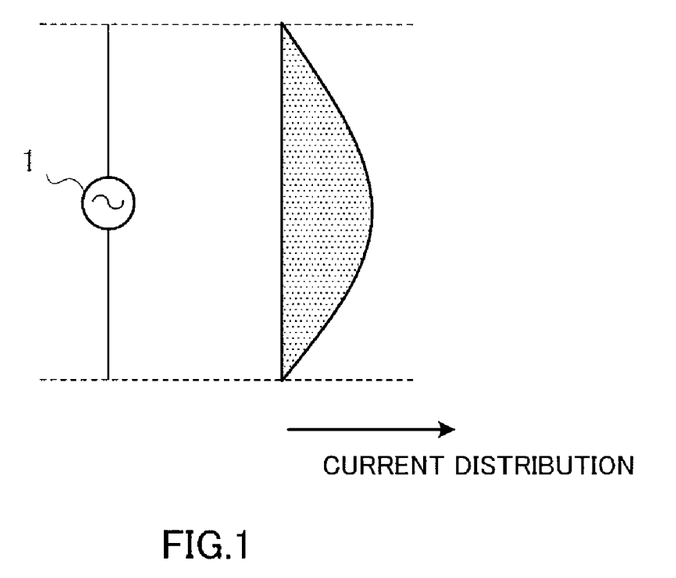
FIG. 1 shows a current distribution of a dipole antenna.

FIG. 1 shows a dipole antenna with an electrical length half the wavelength and its current distribution. As shown in FIG. 1, the dipole antenna generally provides a current distribution in which the peak comes in power feeding section 1.

Figure 2:
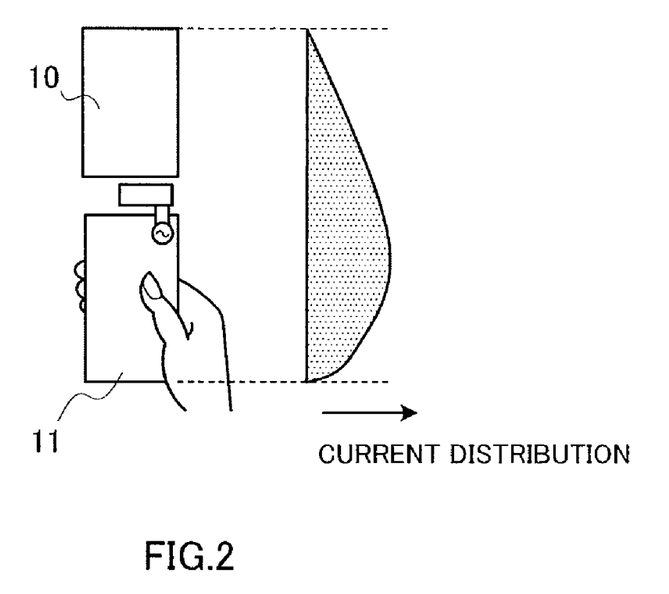
FIG. 2 shows a current distribution of a conventional mobile radio apparatus.

Further, a foldable mobile radio apparatus is known in which the first housing with a display screen and a second housing with an operating part are jointed through a hinge part and in which a power feeding section is provided in the second housing (for example, Patent Document 1). FIG. 2 shows a mobile radio apparatus and its current distribution in Patent Document 1. With Patent Document 1, the display surface that displays images is provided in first housing 10, and the operating part is provided in second housing 11. The user performs communication such as a call holding second housing 11 by the hand. Further, Patent Document 1 discloses that the power feeding section connects to and feeds power to the metal body inside the second housing and the hinge part, and the metal body inside the first housing and the hinge part are electrically connected by capacitive coupling. Accordingly, as shown in FIG. 2, the mobile radio apparatus of Patent Document 1 provides a current distribution in which the peak comes on the second housing side.

Patent Document 1: International Publication No. 06/046712

DISCLOSURE OF INVENTION

Problems to be Solved by the Invention

However, with a conventional apparatus, the power feeding section is provided in the second housing, and therefore, when the mobile radio apparatus is used holding the second housing by the hand, the current is absorbed by the hand and there is a problem that antenna characteristics deteriorate.

It is therefore an object of the present invention to provide a mobile radio apparatus that can prevent deterioration in antenna characteristics by feeding power in a position less susceptible to the influence of the human body such as hands.

Means for Solving the Problem

The mobile radio apparatus according to the present invention employs a configuration which includes: a first housing that has a display surface; a second housing that has an operation panel; a hinge part that joints the first housing and the second housing rotatably; a radio section that is provided in the first housing; a power feeding point that is provided in the first housing and that connects with the radio section; a first conductive part that is arranged in the first housing, and that electrically connects with the power feeding point in the vicinity of the hinge part; and a second conductive part that is arranged in the second housing and that electrically connects with the power feeding point.

Further, the mobile radio apparatus according to the present invention employs a configuration which includes: a first housing that has a display surface; a second housing that has an operation panel; a hinge part that joints the first housing and the second housing rotatably; a radio section that is provided in the first housing; a matching circuit that is arranged on one end side with respect to a center of the first housing in a lateral direction and arranged in the vicinity of the hinge part, and that connects with the radio section; a first conductive part that is arranged in the first housing, and that electrically connects with the matching circuit in the vicinity of the hinge part; and a second conductive part that is arranged in the second housing and that electrically connects with the matching circuit.

Advantageous Effects of Invention

According to the present invention, it is possible to prevent deterioration in antenna characteristics by feeding power in a position less susceptible to the influence of the human body such as hands.

BEST MODE FOR CARRYING OUT THE INVENTION

Hereinafter, embodiments of the present invention will be explained in detail with reference to the accompanying drawings.

(Embodiment 1)

Figure 3:
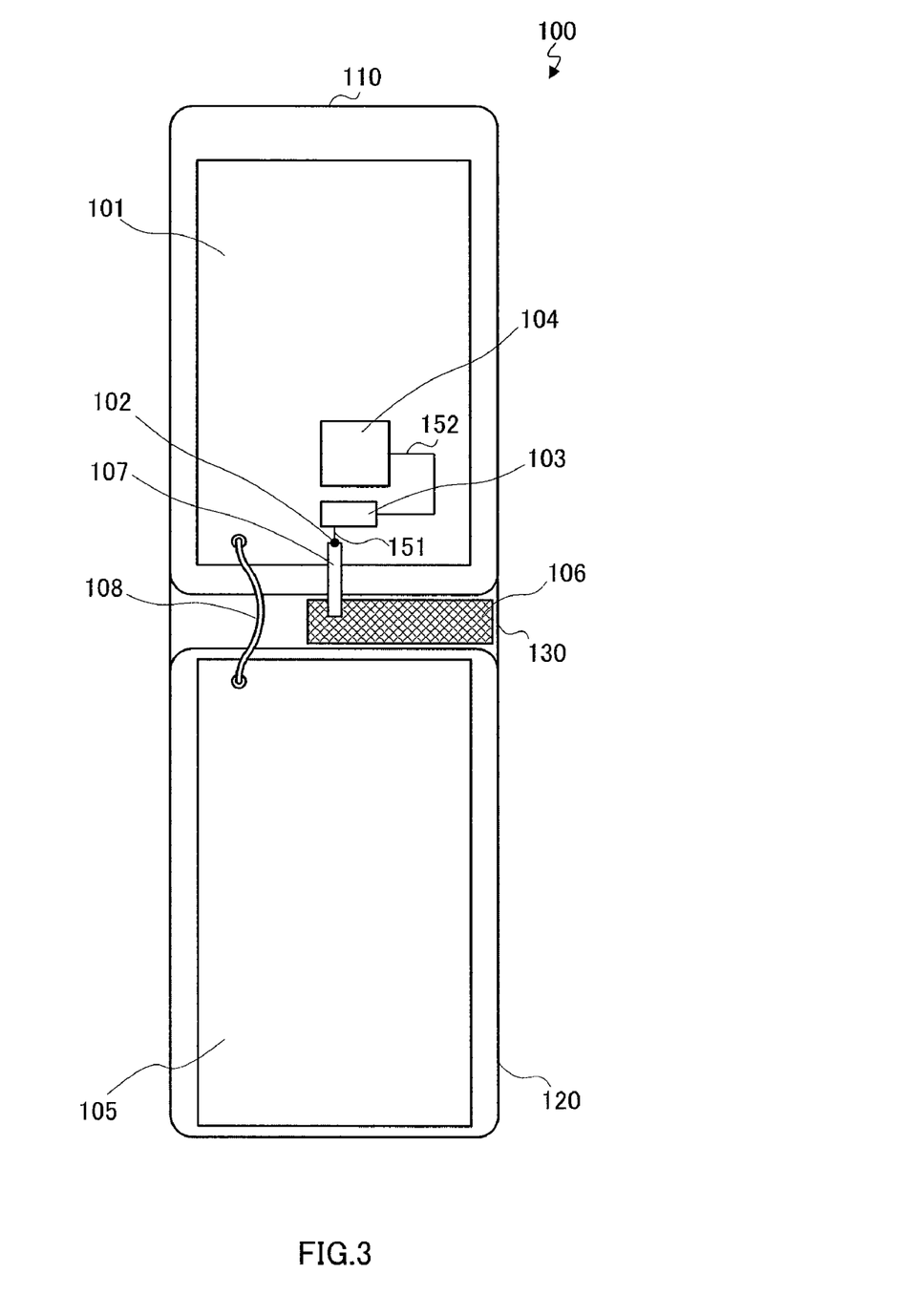
FIG. 3 is a plan view showing a configuration inside a mobile radio device in the open state, according to Embodiment 1 of the present invention.
Figure 4:
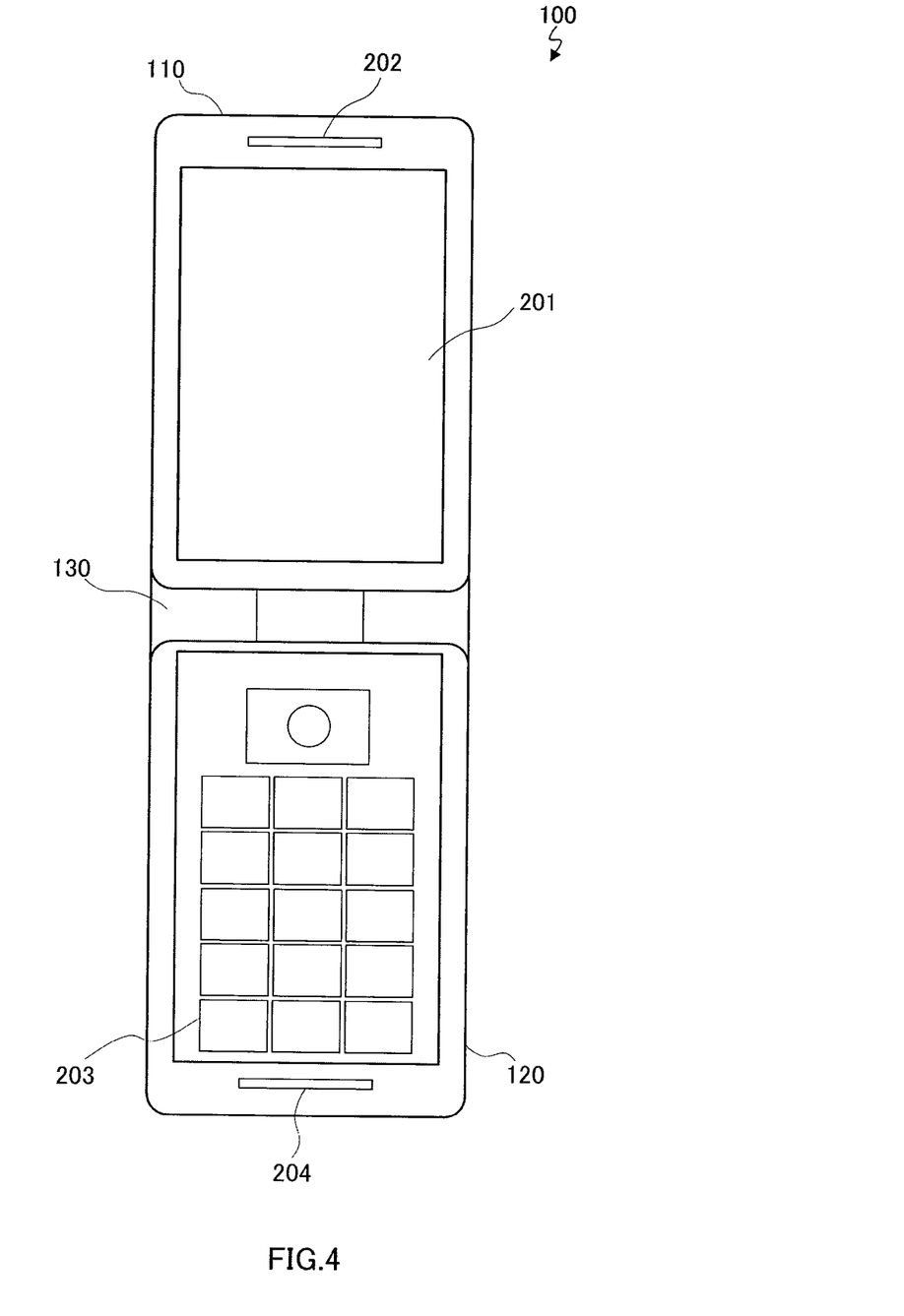
FIG. 4 is a plan view showing a configuration of an exterior of a mobile radio apparatus in the open state, according to Embodiment 1 of the present invention.

FIG. 3 is a plan view showing an interior of mobile radio apparatus 100 in the open state, according to Embodiment 1 of the present invention, and FIG. 4 is a plan view showing an exterior of mobile radio apparatus 100 in the open state, according to Embodiment 1 of the present invention.

Mobile radio apparatus 100 has first housing 110, second housing 120 and hinge part 130, and first housing 110 and second housing 120 are jointed through hinge part 130 and are mutually rotatable through hinge part 130. Further, mobile radio apparatus 100 is folded when display surface 201 and operation panel 203 face each other and first housing 110 and second housing 120 overlap.

As shown in FIG. 3, first housing 110 has a rectangular shape seen from a plan view, and has inside first circuit board 101, substrate connecting part 102, matching circuit 103 and radio section 104. Further, as shown in FIG. 4, first housing 110 has display surface 201 and receiver 202 that are exposed outside. For example, the size of first housing 110 in the vertical direction (in the up and down direction (i.e. longitudinal direction) in FIG. 3 and FIG. 4) is 110 millimeters, and the size in the horizontal direction (i.e. left and right direction (i.e. lateral direction) in FIG. 3 and FIG. 4) is 50 millimeters.

As shown in FIG. 3, second housing 120 has a rectangular shape seen from a plan view, and has inside second circuit board 105. Further, as shown in FIG. 4, second housing 120 has operation panel 203 and microphone 204 that are exposed outside. Furthermore, second housing 120 is held by the human hand during a call. For example, the size of second housing 120 in the vertical direction (i.e. the up and down direction (i.e. longitudinal direction) in FIG. 3 and FIG. 4) is 110 millimeters, and the size in the horizontal direction (i.e. left and right direction (i.e. lateral direction) in FIG. 3 and FIG. 4) is 50 millimeters.

Hinge part 130 joints first housing 110 and second housing 120 mutually rotatably. Further, hinge part 130 has inside hinge conductive part 106 that is arranged along the horizontal direction (i.e. left and right direction of FIG. 3). Furthermore, when first housing 110 and second housing 120 are opened from the folded state, hinge conductive part 106 functions as the axis of rotation to rotate second housing 120 with respect to first housing 110, or as the axis of rotation to rotate first housing 110 with respect to second housing 120.

First circuit board 101 is accommodated in first housing 110. Further, first circuit board 101 has a ground plane (i.e. the first conductive part) that functions as an antenna element, along a plane virtually parallel to display surface 201 (plane that is virtually parallel to the paper of FIG. 3 or FIG. 4). The ground plane forms at least one layer of first circuit board 101 adopting a layer structure, and is printed on virtually the entire surface of first circuit board 101. The present invention is not limited to a case where the ground plane is printed on first circuit board 101, and, instead of a ground plane, it is equally possible to use a flat, electrically conductive member apart from first circuit board 101. Further, on first circuit board 101, wiring pattern 151 for electrically connecting substrate connecting part 102 and matching circuit 103 and wiring pattern 152 for electrically connecting matching circuit 103 and radio section 104 are formed. Further, on first circuit board 101, matching circuit 103 and radio section 104 are mounted.

Substrate connecting part 102 is provided near hinge part 130, and electrically connects with matching circuit 103 through wiring pattern 151 and electrically connects with hinge conductive part 106 of hinge part 130 through third conductive part 107.

Matching circuit 103 is a circuit that makes the impedance of the antenna element and the input impedance of radio section 104 match, and connects with substrate connecting part 102 through wiring pattern 151 of first circuit board 101 and connects with radio section 104 through wiring pattern 152 of first circuit board 101.

Radio section 104 electrically connects with matching circuit 103 through wiring pattern 152 of first circuit board 101, and applies predetermined radio processing to signals of the adjusted impedance received as input from matching circuit 103. Further, radio section 104 has a ground terminal to connect to the ground plane of first circuit board 101.

Second circuit board 105 is accommodated in second housing 120. Further, second circuit board 105 has a ground plane (i.e. the second conductive part) that functions as an antenna element, along a plane virtually parallel to operation panel 203 (plane that is virtually parallel to the paper of FIG. 3 or FIG. 4). The ground plane forms at least one layer of second circuit board 105 adopting a layer structure, and is printed on virtually the entire surface of second circuit board 105. The present invention is not limited to a case where the ground plane is printed on second circuit board 105, and, instead of the ground plane, it is equally possible to use a flat, electrically conductive member apart from second circuit board 105. Further, the end part of the ground plane of second circuit board 105 on the hinge part 130 side is arranged in a position close to hinge conductive part 106, and the ground plane and hinge conductive part 106 are capacitive-coupled.

Hinge conductive part 106 is made of an electrically conductive member, and is accommodated inside hinge part 130 to function as the axis of rotation when first housing 101 and second housing 102 rotate. Further, hinge conductive part 106 is arranged from one end to the near-center of hinge part 130 in the horizontal direction, along the horizontal direction of hinge part 130 (i.e. left and right direction of FIG. 3). Furthermore, connecting part 108 that connects first circuit board 101 and second circuit board 105 is arranged from the near-center to the other end of hinge part 130 in the horizontal direction. Still further, power is fed to hinge conductive part 106 from substrate connecting part 102 through third conductive part 107.

Third conductive part 107 is made of a flexible and electrically conductive material, and electrically connects substrate connecting part 102 and hinge conductive part 106.

Connecting part 108 electrically connects the ground plane of first circuit board 101 and the ground plane of second circuit board 105, and electrically connects the signal line of first circuit board 101 and the signal line of second circuit board 105.

Display surface 201 displays a menu screen and images of received image data.

Receiver 202 outputs, for example, voice of speech data transmitted from the communicating party during a call.

Operation panel 203 is operated by the user to perform, for example, an operation for a call or an operation for viewing a television program.

Microphone 204 collects voice to transmit to the communicating party during a call.

The ground terminal of radio section 104 connects with the ground plane of first circuit board 101 equipotentially, and electrically connects with matching circuit 103 through wiring pattern 152 on first circuit board 101 of radio section 104. Further, the ground plane of second circuit board 105 and hinge conductive part 106 are electrically connected by capacitive coupling, and hinge conductive part 106 connects to substrate connecting part 102 through third conductive part 107 and feeds power to radio section 104 through matching circuit 103. By this means, the ground plane of first circuit board 101, third conductive part 107, hinge conductive part 106 and the ground plane of second circuit board 105 function as the antenna (i.e. first antenna) that resonates at a predetermined resonance frequency.

Figure 5:
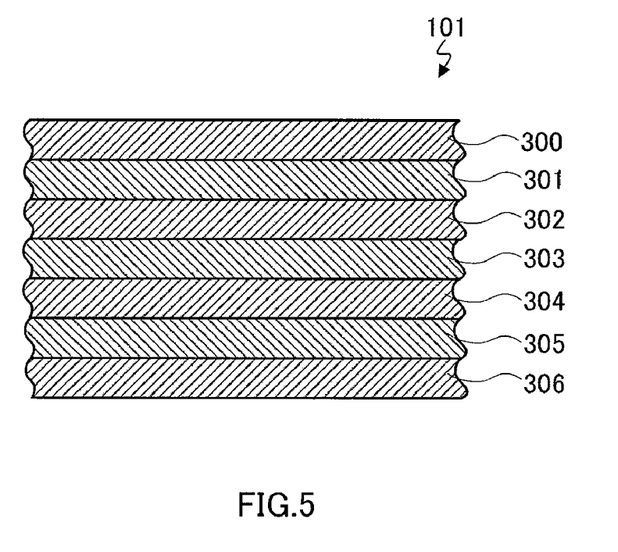
FIG. 5 is a vertical cross-sectional view showing a first circuit board according to Embodiment 1 of the present invention.

FIG. 5 is a vertical cross-sectional view of first circuit board 101 that is accommodated in first housing 110.

As shown in FIG. 5, with first circuit board 101, surface substrate 300 on the surface of which an electrically conductive wiring pattern is printed, insulation layer 301, power supply layer 302, insulation layer 303, ground plane 304 (i.e. first conductive part), insulation layer 305, back surface substrate 306 on the back surface of which an electrically conductive wiring pattern is printed, are laminated in order from above. Ground plane 304 conducts to the surface substrate ground of radio section 104, which is mounted on surface substrate 300 through, for example, a through hole, and is equipotential with the surface substrate ground.

Figure 6:
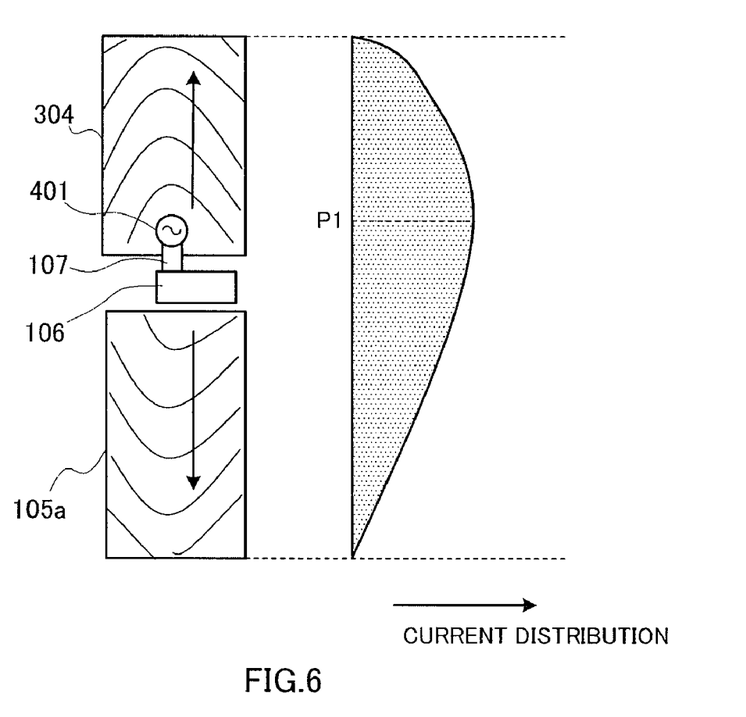
FIG. 6 shows a current distribution according to Embodiment 1 of the present invention.

FIG. 6 shows a current distribution of mobile radio apparatus 100. FIG. 6 shows the spot connecting matching circuit 103 and radio section 104 as power feeding point 401. Note that, in FIG. 6, for ease of explanation, only ground plane 304 of first circuit board 101, power feeding point 401, second circuit board 105, ground plane 105a of second circuit board 105 (i.e. second conductive part), hinge conductive part 106 and third conductive part 107 are shown.

As shown in FIG. 6, mobile radio apparatus 100 can provide an antenna configuration with a current distribution in which peak P1 comes on the ground plane 304 side of first circuit board 101.

As described above, according to the present embodiment, power is fed in the vicinity of the hinge part of the ground plane on the first circuit board in the first housing that is not held by the user's hand, that is, power is fed in a position less susceptible by the influence of the human body, and the power feeding part and the hinge conductive part are electrically connected and the ground plane of the second circuit board and the hinge conductive part are capacitive-coupled, so that it is possible to provide an antenna configuration with a current distribution in which the peak comes on the first housing side. By this means, in case where communication is performed holding the second housing by the hand, it is possible to reduce the influence of the human body against the antenna, and prevent deterioration in antenna characteristics.

(Embodiment 2)

Figure 7:
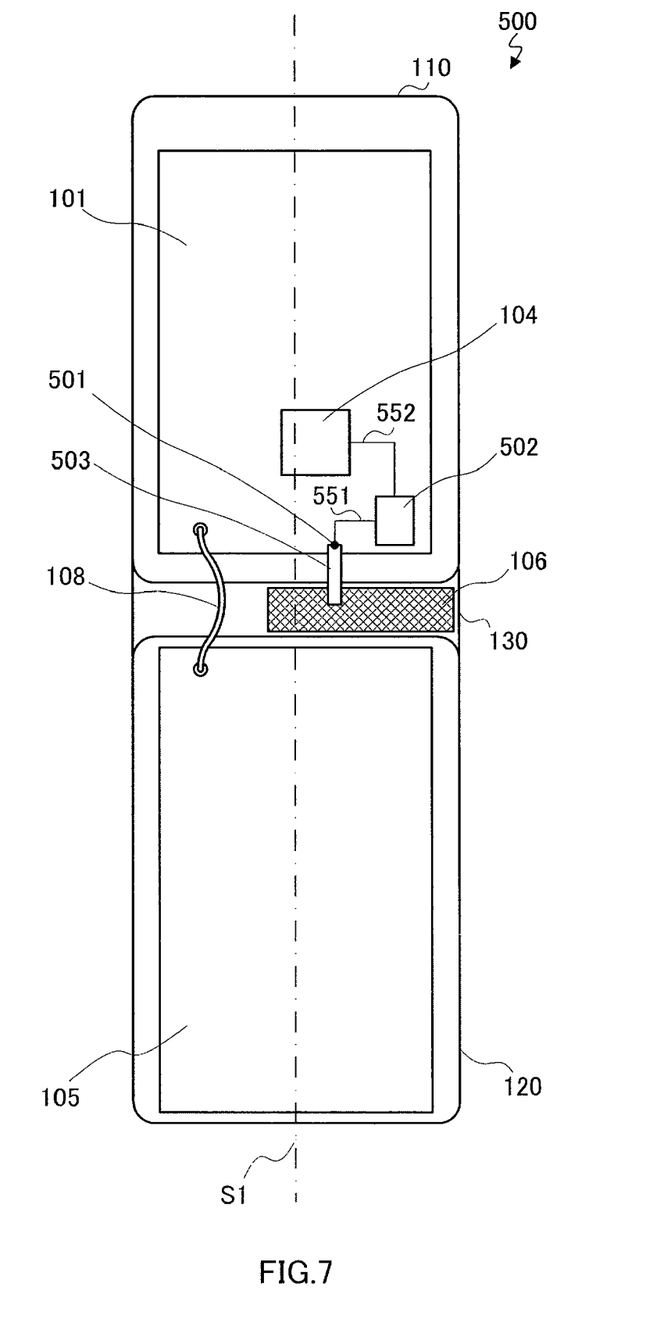
FIG. 7 is a plan view showing a configuration inside a mobile radio apparatus in the open state, according to Embodiment 2 of the present invention.

FIG. 7 is a block diagram showing a configuration of mobile radio apparatus 500 according to Embodiment 2 of the present invention.

Compared to mobile radio apparatus 100 according to Embodiment 1 shown in FIG. 3, mobile radio apparatus 500 shown in FIG. 7 has substrate connecting part 501, matching circuit 502 and third conductive part 503 instead of substrate connecting part 102, matching circuit 103 and third conductive part 107. Note that, in FIG. 7, the same components as in FIG. 3 will be assigned the same reference numerals, and explanation thereof will be omitted. Further, with the present embodiment, the plan view of the exterior of mobile radio apparatus 500 in the open state is the same as in FIG. 4, and therefore explanation thereof will be omitted. Furthermore, with the present embodiment, the vertical cross-sectional view of first circuit board 101 is the same as FIG. 5, and therefore explanation thereof will be omitted.

Mobile radio apparatus 500 has first housing 110, second housing 120 and hinge part 130, and first housing 110 and second housing 120 are jointed through hinge part 130 and are mutually rotatable through hinge part 130. Further, mobile radio apparatus 500 is folded when display surface 201 and operation panel 203 face each other and first housing 110 and second housing 120 overlap.

First housing 110 has first circuit board 101, radio section 104, substrate connecting part 501 and matching circuit 502.

First circuit board 101 is accommodated in first housing 110. Further, first circuit board 101 has a ground plane that functions as an antenna element, along a plane virtually parallel to display surface 201 (plane that is virtually parallel to the paper of FIG. 7). Further, on first circuit board 101, wiring pattern 551 for electrically connecting substrate connecting part 501 and matching circuit 502 and wiring pattern 552 for electrically connecting matching circuit 502 and radio section 104 are formed. Further, on first circuit board 101, matching circuit 502 and radio section 104 are mounted.

Substrate connecting part 501 is provided near hinge part 130, and is provided on one end side with respect to near-center 51 of first housing 110 in the lateral direction (i.e. left and right direction of FIG. 7). Further, substrate connecting part 501 electrically connects with matching circuit 502 through wiring pattern 551, and electrically connects with hinge conductive part 106 of hinge part 130 through third conductive part 503.

Matching circuit 502 is a circuit that makes the impedance of the antenna element and the input impedance of radio section 104 match, and connects with substrate connecting part 501 through wiring pattern 551 of first circuit board 101 and connects with radio section 104 through wiring pattern 552 of first circuit board 101. Further, matching section 502 has a ground terminal connected to the ground plane of first circuit board 101. Furthermore, matching circuit 502 is arranged on one end side with respect to near-center S1 of first housing 110 in the lateral direction and arranged on the side in which substrate connecting part 501 and third conductive part 503 are connected. Still further, on first circuit board 101, matching circuit 502 is preferably arranged as close as possible to the one end side of first housing 110 in the lateral direction and arranged as close as possible to the lower end side (i.e. the lower right side in FIG. 7) of first housing 110 in the longitudinal direction. Matching circuit 502 is the border between the antenna side and the radio circuit side and is the source of the rectified antenna current, so that, by arranging matching circuit 502 as close as possible to the one end side of first housing 110 in the lateral direction and arranged as close as possible to the lower end side of first housing 110 in the longitudinal direction, it is possible to secure the electrical length in the antenna forming the desired communication system.

Radio section 104 electrically connects with matching circuit 502 through wiring pattern 552 of first circuit board 101, and applies predetermined radio processing to signals of the adjusted impedance received as input from matching circuit 502. Further, radio section 104 has a ground terminal connected to the ground plane of first circuit board 101.

Hinge conductive part 106 is formed with an electrically conductive member, is accommodated inside hinge part 130 and functions as the axis of rotation when first housing 101 and second housing 102 rotate. Further, hinge conductive part 106 is arranged from one end to the near-center of hinge part 130 in the horizontal direction, along the horizontal direction of hinge part 130 (i.e. left and right direction of FIG. 7). That is, hinge conductive part 106 is arranged along the horizontal direction of hinge part 130, on the same side as matching circuit 502 with respect to near-center S1. Further, power is fed to hinge conductive part 106 from substrate connecting part 501 through third conductive part 503.

Third conductive part 503 is formed with a flexible and electrically conductive material, and electrically connects substrate connecting part 501 and hinge conductive part 106. Further, third conductive part 503 is arranged on one end side with respect to near-center S1 of first housing 110 in the lateral direction, and arranged on the side in which matching circuit 502 feeds power to the ground plane of first circuit board 101. Preferably, third conductive part 503 connects substrate connecting part 501 and hinge conductive part 106 in the shortest distance.

The ground terminal of radio section 104 connects with the ground plane of first circuit board 101 equipotentially, and electrically connects with matching circuit 502 through wiring pattern 552 on first circuit board 101 of radio section 104. Further, the ground plane of second circuit board 105 and hinge conductive part 106 are electrically connected by capacitive coupling, and hinge conductive part 106 connects to substrate connecting part 501 through third conductive part 503 and feeds power to radio section 104 through matching circuit 502. By this means, ground plane 304 of first circuit board 101, third conductive part 503, hinge conductive part 106 and the ground plane of second circuit board 105 function as the antenna that uses a predetermined frequency as the resonance frequency.

In this case, it is possible to utilize the diagonal directions of rectangular first circuit board 101 and second circuit board 105 and make the electrical length of the antenna longer, so that the antenna formed with ground plane 304 of first circuit board 101, third conductive part 503, hinge conductive part 106 and the ground plane of second circuit board 105 function as a dipole antenna with an electrical length half the wavelength. Further, the antenna formed with ground plane 304 of first circuit board 101, third conductive part 503, hinge conductive part 106 and the ground plane of second circuit board 105 functions as an antenna having a resonance frequency of, for example, 500 MHz. Further, the antenna formed with ground plane 304 of first circuit board 101, hinge conductive part 106 and the ground plane of second circuit board 105 can receive radio waves of, for example, one-segment broadcasting of terrestrial digital broadcasting.

Figure 8:
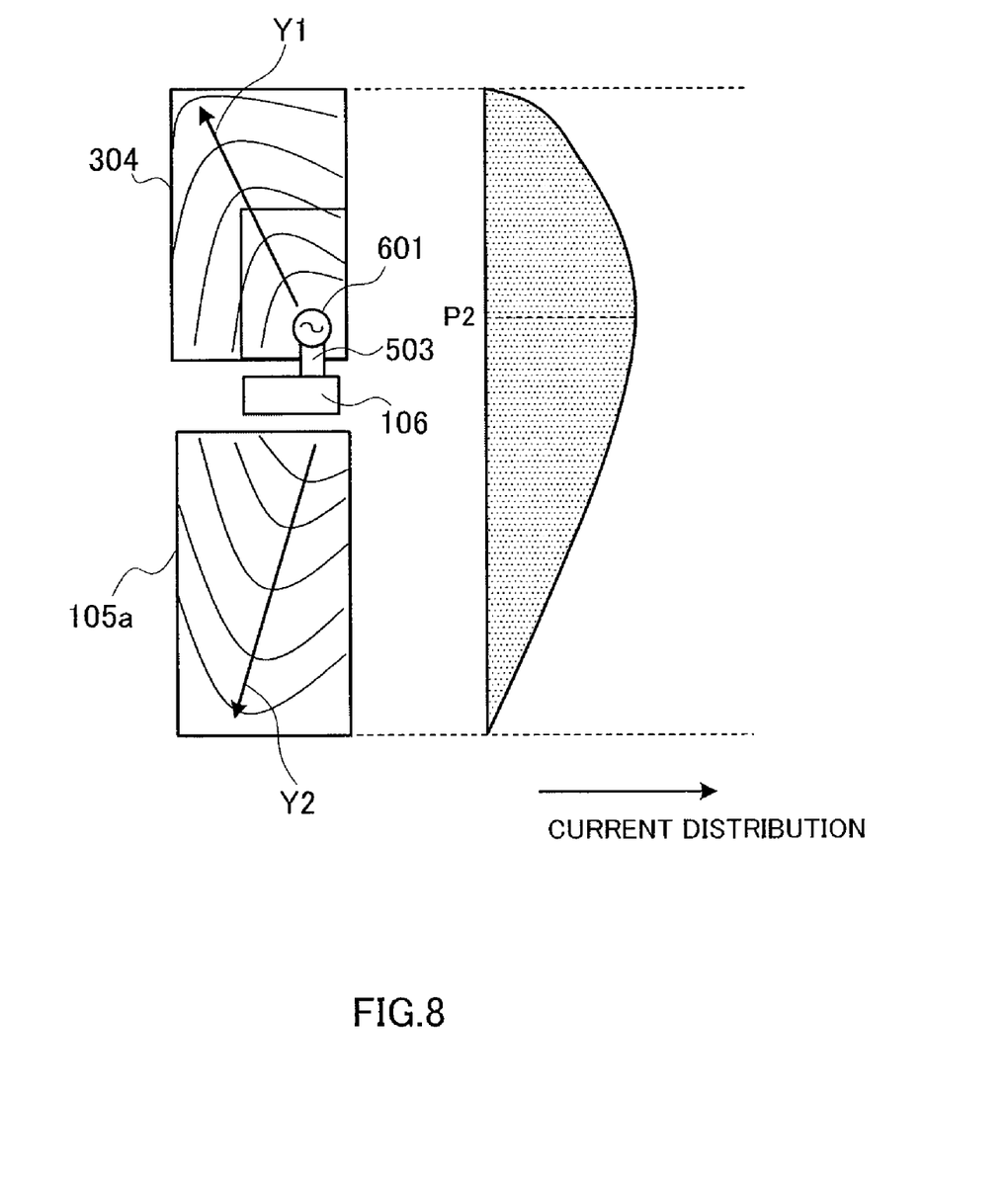
FIG. 8 shows a current distribution according to Embodiment 2 of the present invention.

FIG. 8 shows a current distribution of mobile radio apparatus 500. FIG. 8 shows the spot connecting matching circuit 502 and radio section 104 as power feeding point 601. Note that, in FIG. 8, for ease of explanation, only ground plane 304 of first circuit board 101, power feeding point 601, ground plane 105a of second circuit board 105, hinge conductive part 106 and third conductive part 503 are shown.

As shown in FIG. 8, mobile radio apparatus 500 can provide an antenna configuration with a current distribution in which peak P2 comes on the ground plane 304 side of first circuit board 101. Further, the currents supplied from power feeding point 601 to ground planes 304 and 105a provide a current distribution spreading in the directions indicated by arrows Y1 and Y2, so that it is possible to make the electrical length of the antenna longer. As a result, the antenna formed by setting the electrical length in ground plane 304 of first circuit board 101 one fourth of the wavelength and setting the electrical length in third conductive part 503, hinge conductive part 106 and ground plane 105a of second circuit board 105 one fourth of the wavelength, can use the electrical length half the wavelength.

As described above, with the present embodiment, in addition to the advantage of above Embodiment 1, the electrical length of an antenna can be made longer by arranging a matching circuit near a hinge part and on one end side with respect to the near-center of the first housing in the lateral direction, so that it is possible to form an antenna that supports a wider band more than ever, using components inside the housing. Further, with the present embodiment, it is possible to form a dipole antenna using components inside the housing, so that it is possible to receive radio waves of lower frequencies of, for example, one-segment broadcasting, without projecting the antenna outside. Furthermore, according to the present embodiment, by providing a hinge conductive part in a position facing the substrate connecting part, it is possible to make shorter the connection distance between the substrate connecting part and the hinge conductive part connected by a third conductive part, so that it is possible to reduce electrical loss when power is fed from the substrate connecting part to the hinge conductive part. Still further, according to the present embodiment, it is possible to make shorter the connection distance between a substrate connecting part and a matching circuit by arranging a matching circuit on one end side of the first housing in the lateral direction, so that it is possible to reduce electrical loss when power is fed, suppress the influence due to phase rotation and provide more ideal antenna characteristics of antenna design.

Note that although, with the present embodiment, a dipole antenna is formed with components inside the mobile terminal apparatus such as ground plane 304, third conductive part 503, hinge conductive part 106 and ground plane 105a, the present invention is not limited to this, and it is equally possible to form an antenna with a predetermined antenna length, other than a dipole antenna, using ground plane 304, third conductive part 503, hinge conductive part 106 and ground plane 105a.

(Embodiment 3)

Figure 9:
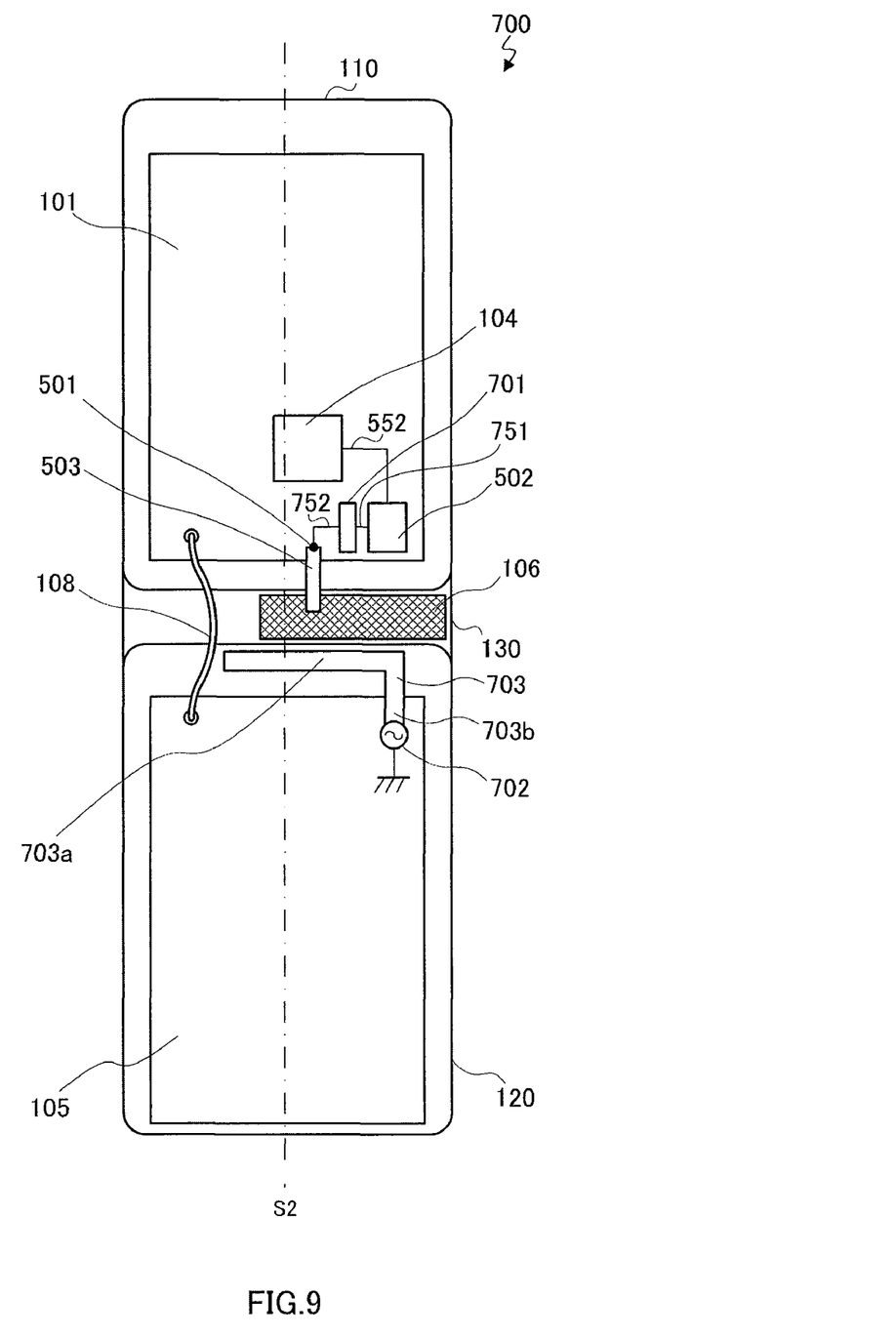
FIG. 9 is a plan view showing a configuration inside a mobile radio apparatus in the open state, according to Embodiment 3 of the present invention.

FIG. 9 is a block diagram showing a configuration of mobile radio apparatus 700 according to Embodiment 3 of the present invention.

Compared to mobile radio apparatus 500 according to Embodiment 2 shown in FIG. 7, adjusting section 701, power feeding section 702 and cellular antenna 703 are added in mobile radio apparatus 700 shown in FIG. 9. Note that, in FIG. 9, the same components as in FIG. 3 and FIG. 7 will be assigned the same reference numerals, and explanation thereof will be omitted.

Substrate connecting part 501 is provided near hinge part 130, and is provided on one end side with respect to near-center S2 of first housing 110 in the lateral direction (i.e. left and right direction of FIG. 9). Further, substrate connecting part 501 electrically connects with adjusting section 701 through wiring pattern 752, and electrically connects with hinge conductive part 106 of hinge part 130 through third conductive part 503.

Adjusting section 701 electrically connects with matching circuit 502 through wiring pattern 751. Further, when communication that uses a dipole antenna and communication that uses a cellular antenna are performed using respective frequencies, adjusting section 701 suppresses the influence upon signals in one communication from the frequency of the other communication. Note that the configuration of adjusting section 701 will be described in detail later.

Matching circuit 502 is a circuit that makes the impedance of the antenna element and the input impedance of radio section 104 match. Further, matching circuit 502 is connected in series between adjusting section 701 and radio section 104. To be more specific, matching circuit 502 connects with adjusting section 701 through wiring pattern 751, and connects with radio section 104 through wiring pattern 552.

Power feeding section 702 is positioned on second circuit board 105, and feeds power to cellular antenna 703.

Cellular antenna 703 (i.e. second antenna) is an antenna used in cellular communication, and resonates in, for example, the range of 900 MHz of the resonance frequency different from the resonance frequency of an antenna formed with the ground plane of first circuit board 101, third conductive part 503, hinge conductive part 106 and the ground plane of second circuit board 105. Further, cellular antenna 703 is arranged near hinge part 130 of second housing 120. Furthermore, cellular antenna 703 has long strip part 703a and short strip part 703b, and is formed in virtually an L-shape as a whole by providing short strip part 703b to extend from one end of long strip part 703a in a direction vertical to the longitudinal direction of long strip part 703a. Still further, long strip part 703a of cellular antenna 703 is arranged close to hinge conductive part 106, along the longitudinal direction of hinge conductive part 106. Moreover, power is fed to cellular antenna 703 from power feeding section 702 through the front end part of short strip part 703b.

The ground terminal of radio section 104 connects with the ground plane of first circuit board 101 equipotentially, and electrically connects with matching circuit 502 through wiring pattern 152 on first circuit board 101 of radio section 104. Further, cellular antenna 703 that electrically connects with the ground plane of second circuit board 105 electrically connects with hinge conductive part 106 by capacitive coupling, and hinge conductive part 106 connects to substrate connecting part 501 through third conductive part 503 and feeds power to the radio section through matching circuit 502. By this means, ground plane 304 of first circuit board 101, third conductive part 503, hinge conductive part 106, cellular antenna 703 and the ground plane of second circuit board 105 function as the antenna that uses a predetermined frequency as the resonance frequency.

In this case, it is possible to make the electrical length of the antenna longer, so that the antenna formed with ground plane 304 of first circuit board 101, third conductive part 503, hinge conductive part 106, cellular antenna 703 and the ground plane of second circuit board 105 functions as a dipole antenna having the electrical length half the wavelength. Further, in this case, the antenna formed with ground plane 304 of first circuit board 101, third conductive part 503, hinge conductive part 106, cellular antenna 703 and the ground plane of second circuit board 105 functions as an antenna having a resonance frequency of, for example, 500 MHz. Further, the antenna formed with ground plane 304 of first circuit board 101, hinge conductive part 106, cellular antenna 703 and the ground plane of second circuit board 105 can receive radio waves of, for example, one-segment broadcasting of terrestrial digital broadcasting.

Figure 10:
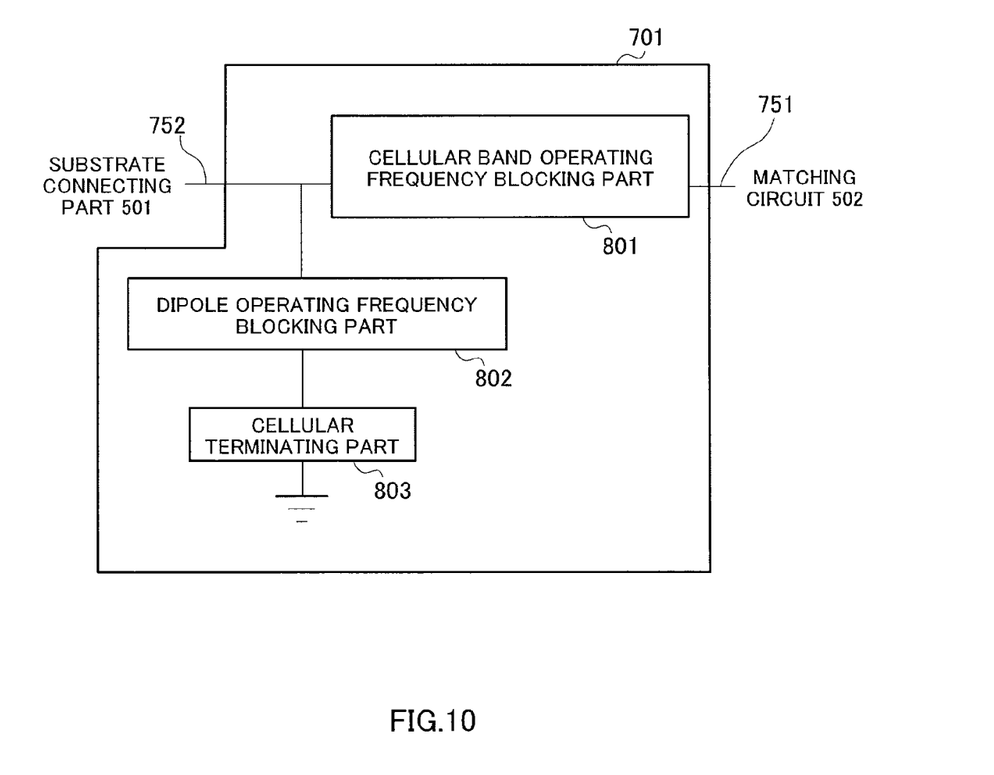
FIG. 10 is a block diagram showing a configuration of an adjusting section according to Embodiment 3 of the present invention.

Next, the configuration of adjusting section 701 will be explained using FIG. 10. FIG. 10 is a block diagram showing a configuration of adjusting section 701.

Cellular band operating frequency blocking part 801 (i.e. second frequency blocking means) is, for example, a lowpass filter, highpass filter, bandpass filter or LC serial resonance circuit. When the dipole antenna and cellular antenna are both used, cellular band operating frequency blocking part 801 blocks the frequency for cellular communication on one hand, and allows the frequency for communication using the dipole antenna, to pass.

Dipole operating frequency blocking part 802 (i.e. first frequency blocking means) is, for example, a lowpass filter, highpass filter, bandpass filter or LC serial resonance circuit. Further, dipole operating frequency blocking part 802 blocks the frequency for communication using the dipole antenna on one hand, and allows the frequency for cellular communication to pass.

Dipole operating frequency blocking part 802 attenuates high frequency power in the operating frequency band for communication using the dipole antenna, and then cellular terminating part 803 (i.e. terminating means) changes the electrical length in the operating frequency band for cellular communication. To be more specific, cellular terminating part 803 electrically connects to the ground plane of the substrate by adjusting the electrical length using a passive element of a coil, capacitor and so on.

FIG. 11 to FIG. 14 illustrate antenna characteristics in case where communication using the cellular antenna of frequency A (i.e. first frequency) and communication using the dipole antenna of frequency B (i.e. second frequency) are performed at the same time.

Figure 11A:
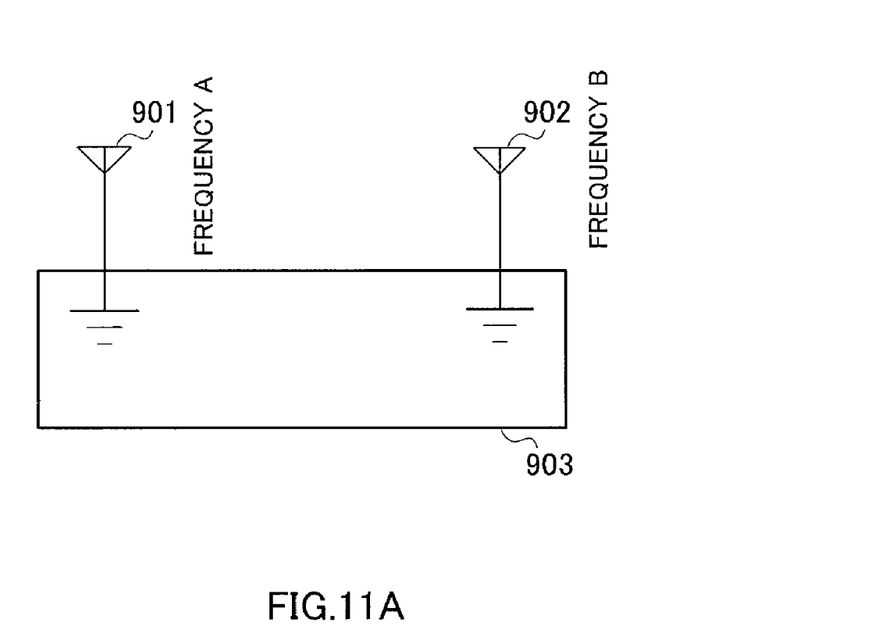
FIG. 11 shows antenna characteristics according to Embodiment 3 of the present invention.
Figure 11B:
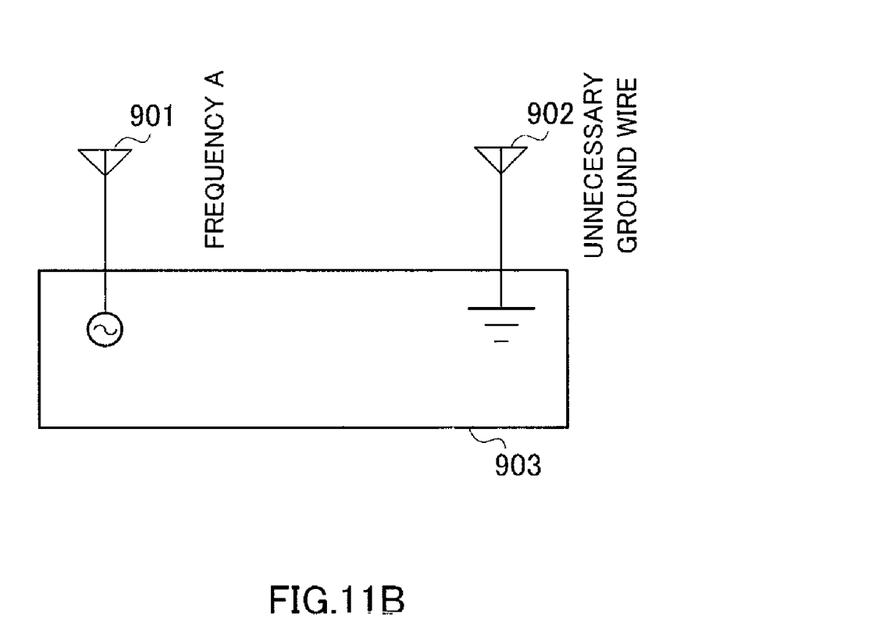

As shown in FIG. 11A, in case where cellular antenna 901 of frequency A and dipole antenna 902 of frequency B are connected to same ground 903 and operated, as shown in FIG. 11B, dipole antenna 902 functions as an unnecessary ground wire for signals of frequency A used in communication through cellular antenna 901, and therefore a current distribution of an antenna of frequency A changes. Therefore, cellular antenna 901 characteristics deteriorate. Like signals of frequency A, the same applies to signals of frequency B used in communication through dipole antenna 902.

Figure 12:
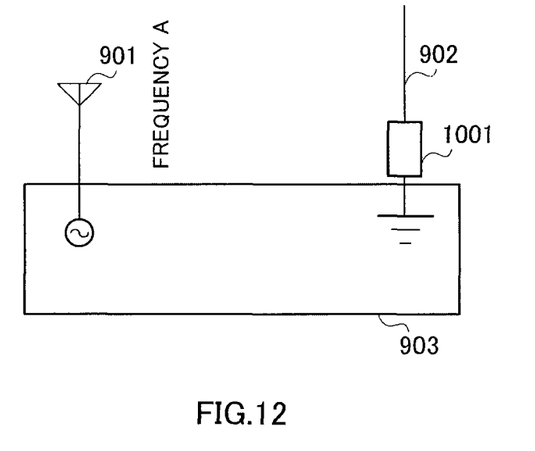
FIG. 12 shows antenna characteristics according to Embodiment 3 of the present invention.

Hence, as shown in FIG. 12, electrical length changing section 1001 is inserted between dipole antenna 902 and ground 903 and the impedance is made high with respect to frequency A to prevent unnecessary ground wire for frequency A, from operating as a ground wire electrically. By this means, it is possible to improve cellular antenna 901 characteristics.

Figure 13:
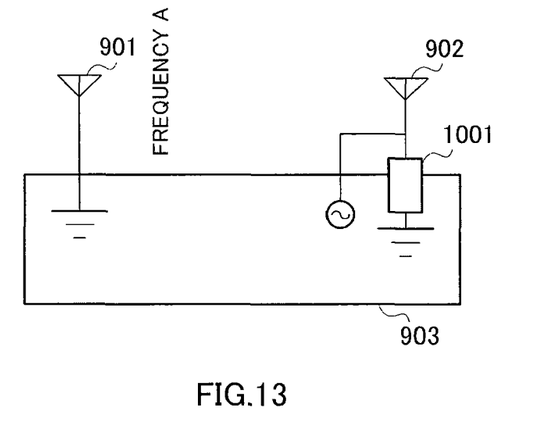
FIG. 13 shows antenna characteristics according to Embodiment 3 of the present invention.

While cellular antenna 901 characteristics improve in case of the configuration of FIG. 12, the current flowing to dipole antenna 902 of frequency B connects to ground 903 as shown in FIG. 13 and dipole antenna 902 characteristics deteriorate.

Figure 14:
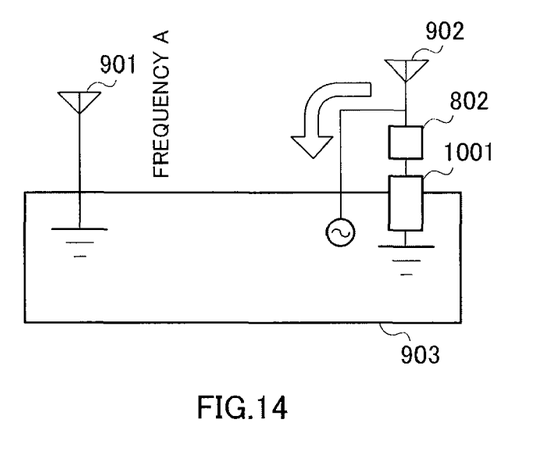
FIG. 14 shows antenna characteristics according to Embodiment 3 of the present invention.

Hence, as shown in FIG. 10 and FIG. 14, dipole operating frequency blocking part 802 and cellular terminating part 803 are connected in series between dipole antenna 902 and ground 903. That is, dipole operating frequency blocking part 802 blocks signals of frequency B, and cellular terminating part 803 terminates signals of frequency A. Note that, in FIG. 14, cellular antenna 901 corresponds to cellular antenna 703, and corresponds to the antenna formed with ground plane 304 of first circuit board 101, third conductive part 503, hinge conductive part 106 and the ground plane of second circuit board 105.

As described above, according to the present embodiment, in addition to the above advantages of Embodiment 1 and Embodiment 2, by connecting a cellular band operating frequency blocking part in series between power feeding section 102 and matching circuit 103 and connecting a dipole operating frequency blocking part and a cellular terminating part to a power feeding section in parallel, a cellular antenna is coupled to a hinge conductive part when the dipole antenna and a cellular antenna are both used, so that it is possible to prevent deterioration in cellular antenna characteristics. Further, it is possible to improve antenna characteristics of both a dipole antenna and a cellular antenna.

Further, although, with the present embodiment, a dipole antenna is formed inside the mobile terminal apparatus, using ground plane 304, hinge conductive part 106 of the hinge part and ground plane 105a, the present invention is not limited to this, and it is equally possible to use ground plane 304, third conductive part 503, hinge conductive part 106 of the hinge part and ground plane 105a as an antenna with a predetermined antenna length, other than the dipole antenna. Further, although, with the present embodiment, a dipole antenna and a cellular antenna are provided, the present invention is not limited to this, and the present invention is also applicable in cases where a dipole antenna and an arbitrary antenna other than a cellular antenna are provided. Further, the present embodiment is applicable to above Embodiment 1.

The disclosure of Japanese Patent Application No. 2008-006001, filed on Jan. 15, 2008, including the specification, drawings and abstract, is incorporated herein by reference in its entirety.

Industrial Applicability

The mobile radio apparatus according to the present invention is suitably receives radio waves of, for example, one-segment broadcasting of terrestrial digital broadcasting utilizing a dipole antenna.

The invention claimed is:

1. A mobile radio apparatus comprising:
    a first housing that comprises a display surface;
    a second housing that comprises an operation panel;
    a hinge part that joints the first housing and the second housing rotatably;
    a radio section that is provided in the first housing;
    a power feeding point that is provided in the first housing and that connects with the radio section;
    a first conductive part that is arranged in the first housing, and that electrically connects with the power feeding point in the vicinity of the hinge part;
    a second conductive part that is arranged in the second housing, that electrically connects with the power feeding point and that is combined with the first conductive part to form a first antenna with an electrical length half the wavelength;
    a second antenna that is arranged near the hinge part of the second housing, and that uses as a resonance frequency a second frequency which is different from a first frequency which is a resonance frequency of the first antenna;
    a first frequency blocking section that connects to the power feeding point, in parallel to the radio section, and that blocks the first frequency; and
    a terminating section that electrically terminates the second frequency which is connected to an output side of the first frequency blocking section.

2. The mobile radio apparatus according to claim 1, further comprising a second frequency blocking section that is connected in series between the power feeding point and the radio section, and that blocks the second frequency.

3. The mobile radio apparatus according to claim 1, wherein:
    the first conductive part is virtually parallel to the display surface; and
    the second conductive part is virtually parallel to the operation panel.

4. The mobile radio apparatus according to claim 1, wherein the power feeding point electrically connects with the first conductive part, on one end side with respect to a center of the first housing in a lateral direction.

5. The mobile radio apparatus according to claim 1, wherein:
    the hinge part comprises a hinge conductive part that electrically connects with the power feeding point; and
    the second conductive part electrically connects with the hinge conductive part.

6. The mobile radio apparatus according to claim 1, wherein:
    the hinge part comprises a hinge conductive part that electrically connects with the power feeding point, in a position facing a position in which the first conductive part electrically connects with the power feeding point; and
    the second conductive part electrically connects with the hinge conductive part.

* * * * *